United States Patent [19]
Wehrmann

[11] Patent Number: 4,590,636
[45] Date of Patent: May 27, 1986

[54] VIBRATION DEVICE FOR THE REMOVAL OF BURRS FROM WORKPIECES CONSTRUCTED AS FOUNDRY CORES OR THE LIKE

[75] Inventor: Gerhard Wehrmann, Mettmann, Fed. Rep. of Germany

[73] Assignee: Georg Fischer Aktiengesellschaft, Schaffhausen, Switzerland

[21] Appl. No.: 622,663

[22] Filed: Jun. 20, 1984

[30] Foreign Application Priority Data

Jun. 20, 1983 [DE] Fed. Rep. of Germany ....... 3322567

[51] Int. Cl.⁴ ............................ A47L 7/02; B08B 3/12
[52] U.S. Cl. ........................................... 15/94; 134/1; 134/6
[58] Field of Search .............................. 134/1, 8, 15, 6; 51/59.55; 15/94; 366/127, 110, 111, 112, 114, 116, 117

[56] References Cited

U.S. PATENT DOCUMENTS 3,154,890  11/1964  Lemelson ..................... 51/59.55
4,486,238  12/1984  Bando ............................. 134/6

FOREIGN PATENT DOCUMENTS 1228492  2/1963  Fed. Rep. of Germany ......... 134/1
0802004  2/1981  U.S.S.R. ............................. 51/59.55

Primary Examiner—Richard V. Fisher
Assistant Examiner—Sharon T. Cohen
Attorney, Agent, or Firm—Marmorek, Guttman & Rubenstein

[57] ABSTRACT

There is disclosed a vibration device for de-burring a workpiece, such as a foundry core 13, 22. The device comprises a de-burring tool 10, 25 having an impact surface with a profile which corresponds with the profile of the region of the workpiece which requires de-burring. The impact surface is vibrated in the clearance between the tool and the profile of the workpiece, so as to de-burr the latter. The vibration device provides flaw-free de-burring of workpieces in automated manner (compared with known manual means) and in a short time period.

13 Claims, 8 Drawing Figures

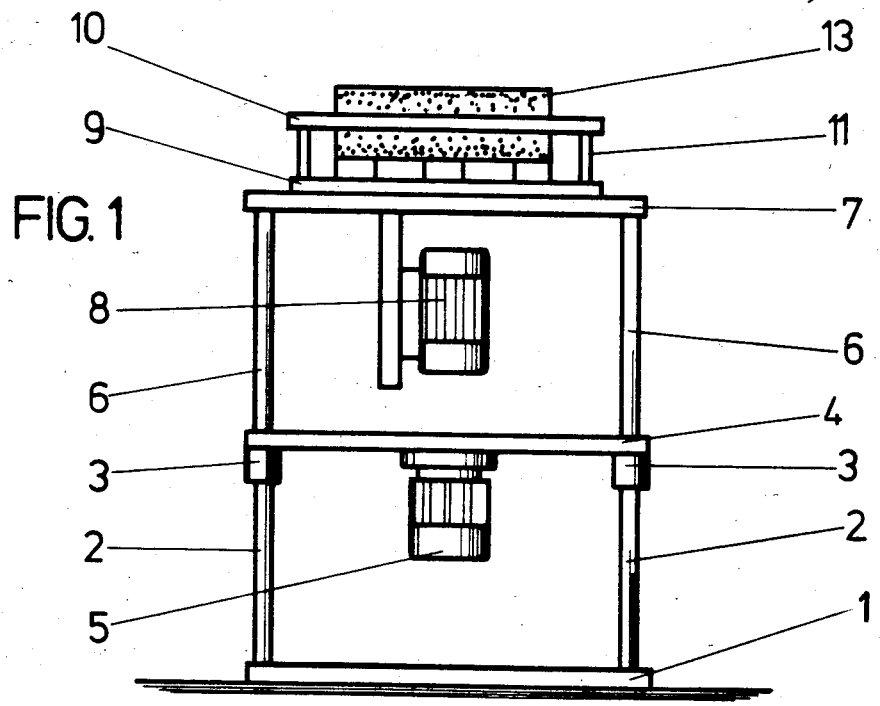
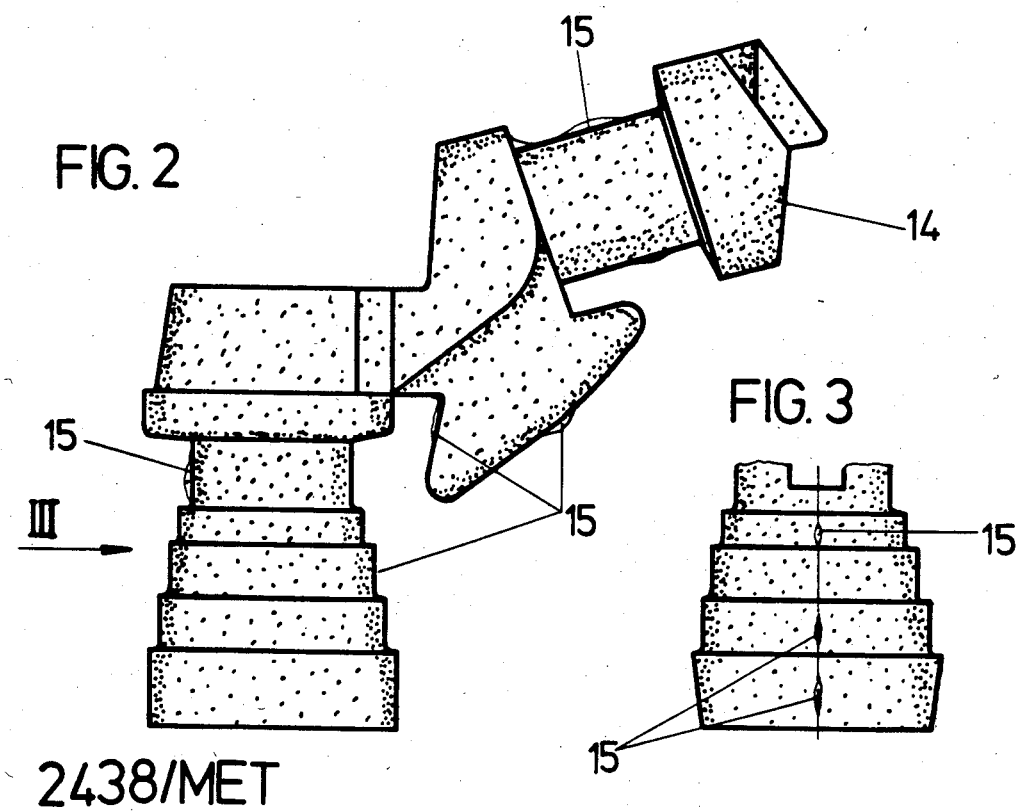

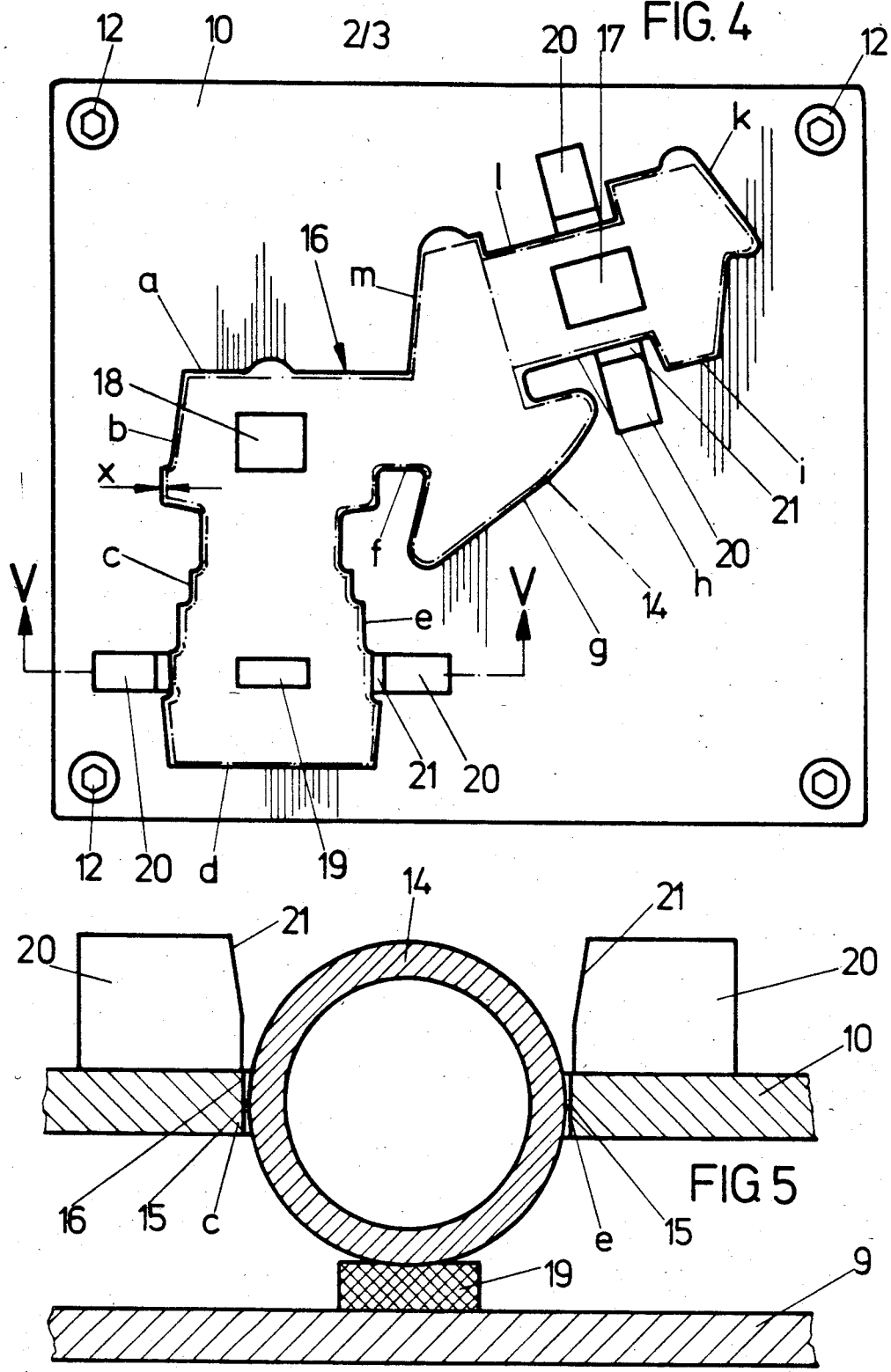

VIBRATION DEVICE FOR THE REMOVAL OF BURRS FROM WORKPIECES CONSTRUCTED AS FOUNDRY CORES OR THE LIKE

This invention relates to a vibration device for the de-burring of workpieces constructed as foundry cores or the like.

Since the production of foundry cores, consisting of quartz sand and a bonding agent, generally takes place in multi-part core moulds, when the foundry cores have been removed from the core moulds, undesirable burrs or "flash" often remain on a level with the parting line. These burrs have to be removed manually which takes time, and is therefore costly. Further, the quality of the de-burring is thus dependent on the person carrying out the de-burring operation. Core burrs that are not removed, mostly lead to spoilage of the subsequent casting.

The invention has been developed primarily with a view to provide for the de-burring of workpieces, such as foundry cores or the like, in a technically simple way which makes possible a particularly short and substantially flaw-free de-burring of the workpieces.

According to the invention there is provided a method of de-burring a workpiece, using a de-burring tool having an impact surface which substantially matches the profile of the workpiece in a region thereof which requires de-burring, in which the impact surface is caused to vibrate so as to make vibrating contact with said region of the workpiece and thereby to de-burr the region.

In a method according to the invention, there is provided a means for de-burring workpieces, particularly when constructed as foundry cores and the like, that are of great functional value. Flaw-free de-burring operations are always achieved and this eliminates subsequent casting flaws. Moreover, the de-burring can be carried out in a particularly short time. It is sufficient to bring the workpiece into stencil-like engagement with the de-burring tool in such a way that the burr then lies on a level with the impact surface(s). Since these are subjected to vibrations, in a certain respect there is an impact and/or abrasion of the burr which thereby is worn-away or flakes-off. The impact surface(s) of the tool are made to suit the material of the workpieces to be treated and to undergo a minimum wear, so that over a long service life satisfactory de-burring operations can be carried out. Savings of up to 70% are possible with respect to conventional hand de-burring. Thus savings are greatest with foundry cores with splitting line of separation burrs that are particularly difficult to trim (along the parting plane). De-burring of work pieces would also be possible in the partial preparation of plastics (plastic joint preparation). In addition procelain workpieces or the like can be treated in a corresponding way. Advantageously, the vibration is effected at right angles to the burr. It is also possible for the vibration to be effected longitudinally of the burr. In addition there is the possibility of permitting the vibration to be carried out simultaneously longitudinally and at right angles to the burr. Further there may be an arrangement such that the clearance between the impact surface(s) and the workpiece changes in dependence on the mass moment of inertia of the workpiece to be de-burred. Furthermore, the amplitude of the vibration oscillations may be adjustable. The parts of the workpiece that are to be treated are thus safely reached. In addition the workpieces undergo a uniform treatment.

A burr passing round the outside of a workpiece may be satisfactorily removed if a stencil-like tool is formed from a substantially vibrating plate, below which there are provided small supports for supporting the workpiece. The steps of the operation for de-burring the workpiece consist substantially in taking hold of the workpiece, bringing it into stencil-like engagement with the plate and taking it out again.

With workpieces in the form of foundry cores made of quartz sand and a bonding agent it is recommended, for the purpose of achieving a long service life, that at least the impact surfaces are hard chromium plates, heavy nickel plated and/or diamond coated, or coated in some other way to avoid wear. On the other hand, with sensitive workpieces it is suggested that the material of the tool be compressible, or yieldable.

Finally, it has proved to be of further advantage for the tool of the vibration device to be arranged to be replaceable. One and the same vibration device can therefore receive different tools.

The invention will now be described in detail, by way of example only, with reference to the accompanying drawings, in which:

FIG. 1 is a side view of a vibration device for use in a method for the de-burring of foundry cores;

FIG. 2 is a side view of a foundry-core to be de-burred;

FIG. 3 is a partial view of this core, seen in the direction of arrow III in FIG. 2;

FIG. 4 is a plan view of the vibration device receiving the foundry-core shown in FIGS. 2 and 3;

FIG. 5 is a section along line V—V in FIG. 4;

Figure 6:
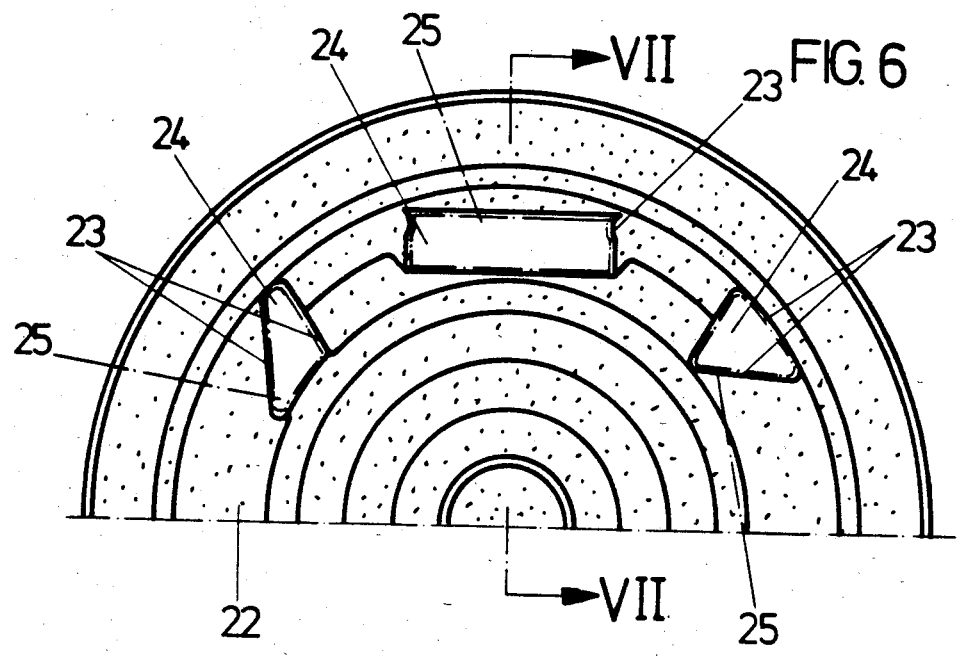
FIG. 6 is a plan view of a modified foundry-core which has apertures running at right angles to its longitudinal direction into which engages a vibration device indicated in dot-dash line.

The vibration device has a base plate 1. From the corner regions of this there extend posts 2 that are upwardly directed and form a basic frame and which, by means of spring elements 3 carry an intermediate plate 4. This latter is used to support an oscillator 5. Flush with the posts 2 there are provided on the intermediate plate 4 further posts 6 forming an oscillation frame, which receive at their free front ends a vibration-table board 7. On its underside there is secured an oscillator 8. The oscillators 5, 8 ensure that the vibration-table board 7 is subjected both to horizontal and to vertical oscillations. The oscillation amplitude lies in the range of 0.5-2 mm.

The vibration-table board 7 carries on its upper side a clamping plate 9, parallel to which extends a plate forming a de-burring tool 10. To maintain clearance between these two plates 9, 10 there are used spacer bolts (separators) 11 into which engage screws 12.

The plate-like tool 10 is used for de-burring workpieces 13, i.e. removing "flash" from workpieces constructed as foundry cores.

In FIGS. 2 and 3 there is shown in detail a foundry core 14. This has burrs 15 in its longitudinal median plane (parting plane) which project from the outer surface according to its shape, and if these burrs are not removed, they cause casting flaws after the castings have been cast.

The tool 10 has a recess 16, which coresponds to the contour of the core 14 on its parting plane, for the purpose of removing the burrs 15. FIG. 4 shows in dotted line that the contour of the workpiece 14 is somewhat smaller than the recess 16. This means that there is a clearance between recess 16 and the foundry-core 14. The wall of the recess 16 forms impact surfaces a, b, c, d, e, f, g, h, i, k, l and m, which surfaces run right round the workpiece 14 and lie on a level with the burr 15. The clearance x between the impact surfaces and the workpiece 14 may be varied in dependence on the mass moment of inertia of the workpiece to be deburred.

Because of its inertia the workpiece does not move synchronously with the oscillations of tool 10.

Below the plate-like tool 10 there are attached underneath the clamping plate 9 small supports 17, 18 and 19. These consist of hard rubber and their purpose is to support the workpiece 14, inserted into the recess 16, so that its burr 15 is on a level with the recess 16. Thus, the de-burring tool is able to receive at least the part of the profile of the workpiece which is to be de-burred.

The impact surfaces are hard chromium plated or heavy nickel plated. However, they may also be coated with diamond or any other type of coating that is resistant to wear. With sensitive workpieces it is recommended to use compressible or yieldable materials for the impact surfaces. However, the composition of the impact surfaces is dependent on the particular type of workpiece to be treated.

In order to facilitate insertion of the workpiece 14 into the recess 16, block-like insertion aids 20 are secured on the edge side of the recess 16 above the tool 10. These aids have insertion slopes 21 facing the recess.

The de-burring of workpieces, in particular foundry cores 13, 14, is carried out in such a way that the oscillators 5, 8 are set in motion. Thus, horizontal and vertical oscillations of 750 to 3600 hertz are transmitted to the vibration-table board 7 and hence to the tool 10 with an amplitude of 0.5–2 mm. They are therefore superimposed vibration oscillations whereby one oscillation component runs in the direction of insertion of the workpiece i.e. in a plane of movement substantially perpendicular to the general longitudinal extent of the burrs 15, and the other component is generally longitudinally of the burrs or in the plane thereof. Now the workpiece, and therefore the foundry core, can be inserted into the recess 16 and lowered onto the small supports 17, 18, 19. Subject to the vibration oscillations, the impact surfaces act constantly on the burrs 15. Because of inertia and carrying-along of the workpiece, there is a constant action of this workpiece on a level with the de-burring point, whereby the burr 15 is struck and/or abrades, and accordingly broken-off. This process takes very little time, so that almost immediately after insertion of the workpiece 14 it can be taken out again. The appropriate adjustment (co-ordination) of clearance x and the amplitude of the vibration oscillation facing the clearance leads to a uniform all-round de-burring of the workpiece on a level with its longitudinal median plane.

Figure 7:
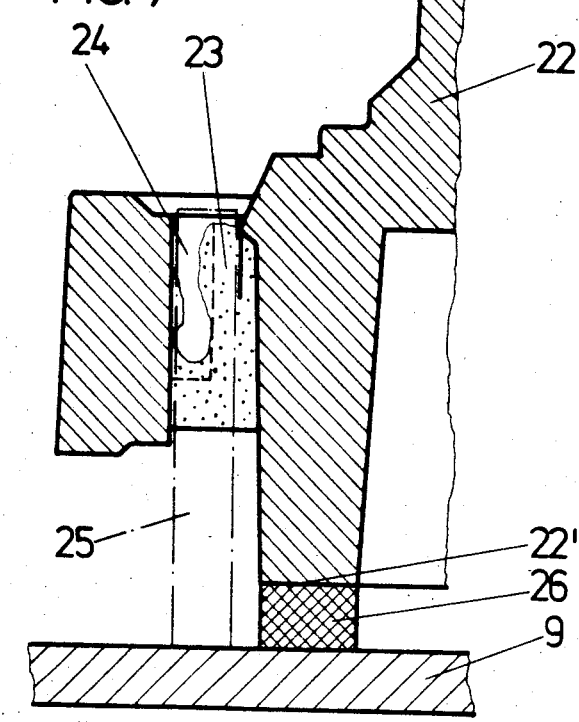
FIG. 7 is a section along line VII—VII in FIG. 6.
Figure 8:
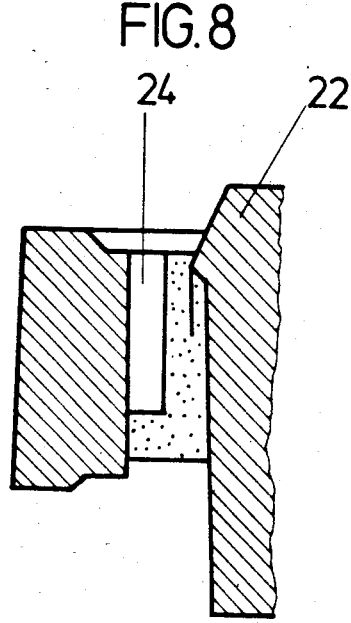
FIG. 8 is a representation according to FIG. 7, in which the burr is removed.

FIGS. 1 to 5 illustrate the de-burring of the external profile of a workpiece 13. However, FIGS. 6 to 8 show a workpiece 22, constructed as a foundry core in which internal burrs 23 are to be removed in the region of apertures 24. Here manual de-burring would be particularly difficult.

For the purpose of deburring, on the vibration device there are provided upwardly directed fingers 25 which extend from the clamping plate 9, which fingers are adapted to the cross section of the apertures 24 and which represent the tool. In addition the clamping plate 9 is equipped with small supports 26, on which the lower front edge 22' of the workpiece 22 is placed.

To deburr the foundry core 22, it is brought with its apertures 24 into alignment with the tool fingers 25. It can then be lowered and this lowering is limited by the small supports 26. Because of the vibration oscillations exerted on the tool 25, the burr 23 is struck and/or abraded, so that when the workpiece 22 has been removed, the burr is completely removed, c.f. FIG. 8. With this version also there is a stencil-like engagement between the tool 25 and the workpiece 22. Moreover, the clearance between the impact surfaces of the tool fingers 25 and the workpiece 22 is adapted to the amplitude of the vibration oscillation facing the clearance.

All novel features disclosed herein may have inventive significance, even if they are not specifically referred to in the claims.

I claim:

1. A vibration device for removing burrs from a peripheral edge of a workpiece, comprising
   gripping means for holding said workpiece, said gripping means having impact surfaces which substantially conform to said peripheral edge of said workpiece at least in the region of said burrs, said impact surfaces being spaced apart from said peripheral edge so as to define a clearance therebetween, and oscillation means for vibrating said impact surfaces against said burrs,
   whereby said impact surfaces make vibrating contact with said burrs to mechanically remove said burrs from said workpiece.

2. The vibration device of claim 1 wherein said gripping means substantially surrounds said workpiece about said peripheral edge.

3. The vibration device of claim 2 wherein said gripping means includes a plate which holds said workpiece in a stencil-like interlocking position.

4. The vibration device of claim 3 wherein said gripping means includes supporting means disposed at a level below said plate for supporting said workpiece.

5. The vibration device of claim 1 wherein the oscillation means provides vibrations of said impact surfaces in a plane substantially perpendicular to the general plane of said burrs.

6. The vibration device of claim 1 wherein the oscillation means provides vibrations of said impact surfaces in a plane substantially parallel to the plane of said burrs.

7. The vibration device of claim 1 wherein the oscillation means provides vibrations of said impact surfaces both in a plane substantially perpendicular to the general plane of said burrs and in a plane substantially parallel to the general plane of said burrs.

8. The vibration device of claim 1 including means for adjusting said clearance so as to depend upon the moment of inertia of said workpiece.

9. The vibration device of claim 8 including means for adjusting the amplitude of vibrations.

10. The vibration device of claim 1 wherein said impact surfaces are made from a wear-resistant material.

11. The vibration device of claim 10 wherein said wear-resistant material comprises a coating selected from the group consisting of chromium, nickel and diamond.

12. The vibration device of claim 1 wherein said impact surfaces are made from a compressible material.

13. The vibration device of claim 1 including means for replacing said gripping means.

* * * * *